No. 624,295. Patented May 2, 1899.
D. CARPENTER.
BICYCLE.
(Application filed Feb. 19, 1897.)
(No Model.)
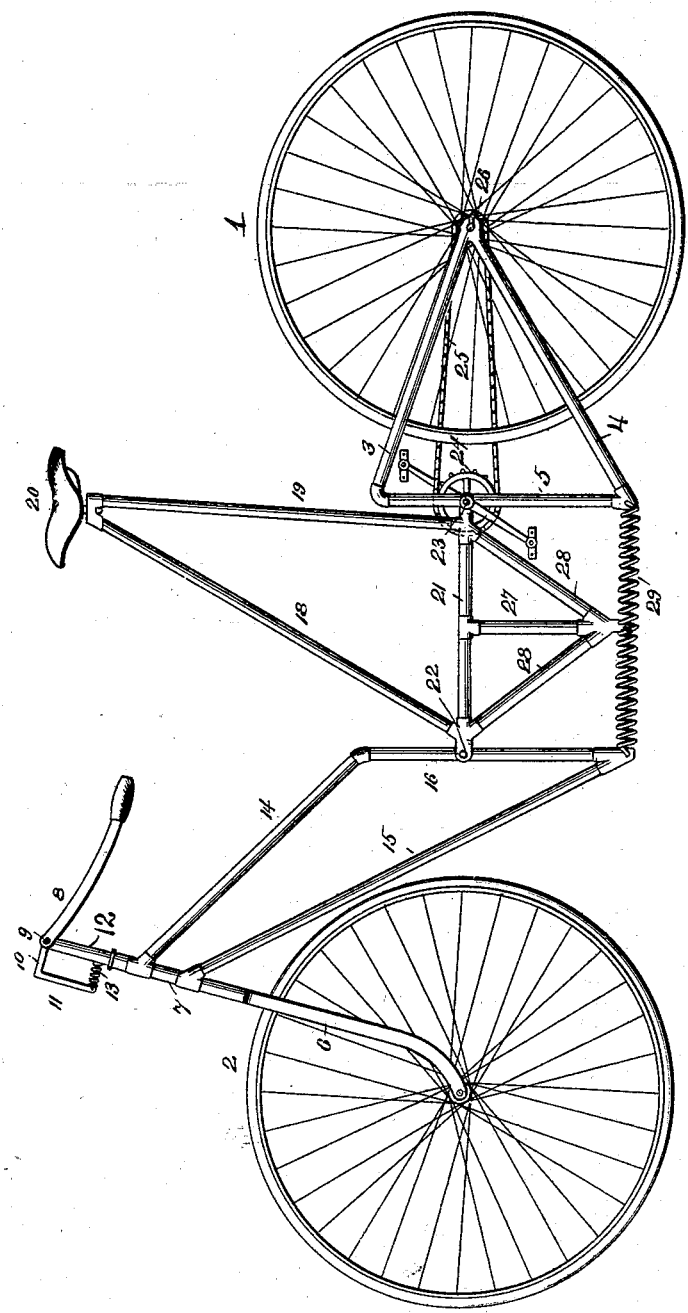
WITNESSES
INVENTOR
Daniel Carpenter

UNITED STATES PATENT OFFICE.

DANIEL CARPENTER, OF GOSHEN, NEW YORK.

BICYCLE.

SPECIFICATION forming part of Letters Patent No. 624,295, dated May 2, 1899.

Application filed February 19, 1897. Serial No. 624,146. (No model.)

*To all whom it may concern:*

Be it known that I, DANIEL CARPENTER, a citizen of the United States, residing at Goshen, in the county of Orange and State of New York, have invented certain new and useful Improvements in Bicycles; and I do hereby declare the following to be a full, clear, and exact description of the invention, such as will enable others skilled in the art to which it appertains to make and use the same.

This invention relates broadly to vehicles and specifically to bicycles and other foot-propelled vehicles.

The aim of the present invention is to provide a spring-frame, or, in other words, a frame composing several parts or sections, which are hingedly connected and held in normal position by means of one or more springs, which adapt the several portions or sections to yield with relation to each other, thus adapting the wheels to rise and fall without affecting the intermediate portion of the frame. The improved construction thus adapts all vibration and jar to be absorbed without being communicated to the rider or occupant of the vehicle.

The invention also has for its aim to provide a pivotally-mounted and spring-cushioned handle-bar, whereby the rider's hands and arms are protected from receiving the vibration of the frame.

With these and other objects in view the invention consists in certain novel features and detail of construction and arrangement of parts, as hereinafter fully described, illustrated in the drawing, and pointed out in the claims.

The accompanying drawing represents a side elevation of a bicycle constructed in accordance with the present invention.

Referring to the drawing, 1 designates the driving-wheel, and 2 the front or steering wheel, of the machine. The driving-wheel is mounted in a triangular frame, comprising forwardly-diverging forks 3 and 4.

3 designates the upper rear fork, and 4 the lower rear fork, the said forks being connected at their forward ends by a substantially vertical bar 5.

The front or steering wheel 2 is mounted in a steering-fork 6, which passes through the head-tube 7 of the machine-frame and which has pivotally connected to its upper end a handle-bar 8, fulcrumed in a transverse horizontal axis 9, so that it may oscillate up and down. The handle-bar 8 is provided at its center portion with a forwardly-projecting arm 10, having a depending rigid portion 11, which extends downward in front of the handle-bar stem 12 and in substantially parallel relation thereto. Between the extension 11 and the stem 12 is an interposed spring 13, attached at its opposite ends to said parts and adapted to allow the extension 11 to move toward and away from the stem 12 for permitting the oscillation of the handle-bar. Riding upon rough and uneven surfaces the handle-bar is thus allowed to yield, thereby absorbing any vibration of the frame and preventing its communication to the hands and arms of the rider. Connected to the head-tube 7 is a triangular frame consisting of an upper reach-bar 14 and a lower reach-bar 15, which diverge rearwardly and are connected to a substantially vertical bar 16.

The front and rear frames above described are connected pivotally to the seat-frame, which comprises downwardly-diverging bars 18 and 19, connected at their upper ends and forming a rest for the saddle 20, the lower ends of said bars being connected to a substantially horizontal bar 21, the opposite ends of which are pivotally connected at 22 and 23 to the bars 5 and 16 of the rear and front frames, respectively. The pivot 23 is formed by the crank-axle, which carries the usual cranks and pedals and which is also provided with a driving sprocket-wheel 24, from which a driving-chain 25 extends around a sprocket-pinion 26 on the driving-wheel 1. The bar 21 is provided intermediate its ends with a depending bar 27, the lower end of which extends to about the horizontal plane of the lower ends of the bars 5 and 16, and said bar 27 is further connected to the bar 21 by means of the downwardly-converging braces 28.

29 designates a spring which extends horizontally between the bars 5 and 16, to which said spring is connected. The spring 29 is also connected to the lower end of the bar 27, so as to maintain the seat-frame in proper relation to the front and rear frames. Instead of a single spring 29 two or more springs may be employed.

By reason of the construction above described the front and rear wheels may yield up and down with relation to each other and to the seat-frame, the spring 29 yielding to allow of such movement and acting to right the parts to their normal positions. This renders the machine easy-running and dispenses with the necessity of using cushion or pneumatic tires, although such tires may be used, if desired. Ordinarily, however, solid-rubber tires of any size or width may be employed. The pivots 22 and 23 may be provided with ball-bearings, thus allowing the several frames to oscillate freely in relation to each other. By reason of the spring 29 acting in a horizontal direction no disagreeable vibration or jar is communicated to the saddle.

The improvement hereinabove described may be applied to wagons, carriages, and other vehicles with equally-desirable results, and pneumatic cushions may be substituted for the springs, if desired.

Having thus described the invention, what is claimed as new, and desired to be secured by Letters Patent, is—

1. In a wheeled vehicle, the combination with separate and independent front and rear frames in which the carrying-wheels are mounted, of a separate and independent intermediate frame pivotally connected thereto on independent horizontal axes, located at a distance from each other, and a contractile spring located below the pivotal points of the frames and interposed between the front and rear frames and also connected to the intermediate frame, substantially as and for the purpose specified.

2. In a bicycle, the combination with the front and rear wheels, of separate and independently-movable frames in which said wheels are journaled, said frames comprising substantially vertical bars, a seat-frame arranged between said wheel-frames and pivotally connected thereto on independent horizontal axes and also provided with a depending portion lying intermediate the vertical bars of the wheel-frame, and a contractile spring interposed between the vertical bars of the wheel-frames and the depending portion of the seat-frame, substantially as described.

In testimony whereof I have signed this specification in the presence of two subscribing witnesses.

DANIEL CARPENTER.

Witnesses:
HENRY B. KNIGHT,
FRED. J. KNIGHT.